United States Patent [19]

Holmes

[11] Patent Number: 4,515,291

[45] Date of Patent: May 7, 1985

[54] SEED PLANTER, PLANTER ASSEMBLY AND METHOD OF PICKING UP AND DISCHARGING SINGLE SEEDS

[75] Inventor: Robert G. Holmes, Columbus, Ohio

[73] Assignee: The Ohio Agricultural Research and Development Center, Wooster, Ohio

[21] Appl. No.: 428,097

[22] Filed: Sep. 29, 1982

[51] Int. Cl.$^3$ .................. A01C 5/00; B65G 59/04
[52] U.S. Cl. .................. 221/211; 221/263; 221/277; 111/85
[58] Field of Search .................. 111/36, 61, 85, 77, 111/78; 221/210, 211, 253, 263, 266, 277, 278; 294/64.2, 64.3

[56] References Cited

U.S. PATENT DOCUMENTS

| | | | |
|---|---|---|---|
| 2,505,758 | 5/1950 | Enebeck | 221/211 X |
| 2,605,017 | 7/1952 | Bolen | 221/211 X |
| 3,412,908 | 11/1968 | Ferrault | 111/77 X |
| 3,548,765 | 12/1970 | Grataloup | 111/77 X |
| 3,698,332 | 10/1972 | McCallum | 111/77 |
| 3,843,018 | 10/1974 | Holmes et al. | 221/211 |
| 4,047,638 | 9/1977 | Harrer et al. | 221/266 |
| 4,239,126 | 12/1980 | Dobson et al. | 221/211 |
| 4,241,849 | 12/1980 | Harrer | 221/266 |

FOREIGN PATENT DOCUMENTS 1227216 10/1966 Fed. Rep. of Germany ..... 294/64.3
1054966 1/1967 United Kingdom ............... 294/64.3

OTHER PUBLICATIONS

Rohrbach et al., "A New Concept in Seed Metering"; Jul. 1970; Am. Soc. of Agric. Eng.; Paper No. 70-108.

Primary Examiner—Joseph J. Rolla
Attorney, Agent, or Firm—Sidney W. Millard

[57] ABSTRACT

A seed planter comprises a seed transport member, usually in the form of a disc, having a number of depressions provided with ramp surfaces sloping downwardly from the surface of the seed transport member into the depression. Air is fed into the deepest portion of the depression and a single seed is trapped in this portion by the low pressure region which forms between the seed and the walls of the depression. Ejection of the seed from the depression is accomplished by increasing the pressure in this low pressure region. The planter is capable of metering spherical seeds very accurately at metering rates of about 40 seeds per second and can be made of small width so that a single row of planters on a planter assembly can plant closely spaced rows. The planter can also be used for sorting seed, for example by distinguishing spherical seeds from flat seeds. A planter assembly capable of planting multiple rows of seeds is provided by mounting a plurality of the seed planters on a frame.

12 Claims, 6 Drawing Figures

SEED PLANTER, PLANTER ASSEMBLY AND METHOD OF PICKING UP AND DISCHARGING SINGLE SEEDS

BACKGROUND OF THE INVENTION

This invention relates to a seed planter, to a planter assembly and to a method of picking up and discharging single seeds. More specifically, the invention relates to a seed planter, planter assembly, and method in which accurate metering of the seeds is achieved by means of jets of gas.

In the application, the term "seed planter" is used to denote an apparatus which supplies a single stream of seeds, theoretically one at a time. In normal agricultural use, a machine is used which comprises a number (typically about 20) of seed planters mounted upon a framework and provided with an appropriate drive mechanism to supply power to the planters. Such a machine, which is normally referred to by farmers as a "planter" is designated herein by the term "planter assembly".

A seed planter must be designed having regard to several different, and often antipathetic, requirements. The planter should of course not damage the seed which it handles, since damage to the seed will reduce the germination rate and consequently the crop yield. In most cases, the seeds should be planted one at a time, and the spacing along a row of seeds should conform accurately to a predetermined value; however, since it may be necessary to vary the spacings between rows because of the type or variety of seeds being planted or because of the environmental conditions under which the seed will be grown, the planter assembly should allow adjustment of the row spacing when desired. In order to reduce the time and cost of planting, the planter should be capable of delivering seeds accurately at a predetermined spacing when the tractor towing the planter assembly incorporating the planters is moving across the field at its maximum working speed, which in the case of most modern tractors is about seven miles (11 km.) per hour. The metering rates involved in operating at this speed are considerable; for example, soybean seeds are normally planted with a three inch (7.5 cm.) spacing between adjacent seeds in each row, so that when the tractor is moving at seven miles per hour the planter must meter approximately 41 seeds per second. Accuracy of timing in delivering the seeds is crucial; for example, in the example previously given where the planter is metering about 41 seeds per second, a delay of only 25 milliseconds in delivering one seed will cause two seeds to issue from the planter simultaneously, so that one planting position will not receive a seed while the next will receive two seeds instead of one. Even when the actual metering part of the seed planter functions correctly, delays on the order of 100 milliseconds are common in commercial planters because such planters frequently incorporate a delivery chute to control the movement of the seeds after they have passed through the metering part of the planter, and the varying angles at which the metered seeds strike the walls of this delivery chute cause variations in the time of delivery of the seeds. Finally, it is important that a planter have a small width, since the minimum spacing between rows which a planter assembly can achieve is governed by the width of the individual planters. (It is possible to mount two separate rows of planters on a planter assembly, planters in the two rows planting alternate rows of seeds so that the minimum spacing between adjacent rows can be half the width of the planter, but such an arrangement increases the size, complexity and weight of the planter assembly; in particular a more complicated drive train arrangement is needed to supply power to the two rows of planters.) The inability of commercially-produced planters to plant rows of seeds close together has forced farmers to adopt nonoptimum cultivation practices. For example, agricultural botanists have determined that the optimum yields of soybeans are achieved by planting the beans with seven inch (17.5 cm.) spacings both between adjacent seeds in a row and between adjacent rows. However, commercially-produced soybean planters are not capable of planting with only a seven inch spacing between adjacent rows, and thus farmers are forced to plant soybeans with a 20 inch (50 cm.) spacing between rows and a three inch (7.5 cm.) spacing of seeds within each row, a practice which perceptibly reduces the crop yield.

In the case of soybean and some other crops, no existing planter adequately fulfills all the above requirements. One early type of soybean planter comprised a cylindrical seed hopper having a vertical axis. A circular recess was formed in the base of the hopper and within this recess rotated a disc having semicircular cutouts at regular intervals around its periphery. When seed was placed in the hopper, seeds became lodged in the cutouts in the wheel, theoretically at the rate of one seed per cutout, and were transported around the recess as the wheel rotated. A shield was fixedly mounted within the hopper so as to extend above a portion of the periphery of the rotating wheel, leaving only a small clearance between the upper surface of the wheel and the shield, so that the only seeds which were permitted to enter beneath the shield were those trapped in the cutouts in the wheel. While passing beneath the shield, the cutouts passed successively over a seed discharge opening formed in the bottom of the hopper and were thus allowed to fall from the cutouts onto the ground, the small clearance between the upper surface of the wheel and the shield preventing seeds not received in the cutouts flowing from within the hopper through the seed discharge opening.

This type of planter achieves reasonably accurate metering of the seed, but is only useable at relatively low metering speeds of about twenty seeds per second (equivalent to a tractor speed of about four miles per hour). The friction between the wheel and the seeds lying in contact with its upper surface, and between the seeds lodged in the cutouts and the base of the hopper, causes damage to the seeds, and this seed damage increases sharply with tractor speed. At tractor speeds above about four miles per hour, damage to the seed becomes too severe to be acceptable.

A second commercially-produced type of planter comprises a disc rotating in an inclined plane. Twelve "fingers" are distributed over one face of the disc at regular angles. Each of these fingers comprises a shaft capable of pivoting about its own axis and extending substantially radially of the disc and a flat blade extending at right angles to the shaft and lying adjacent the periphery of the disc. A rather complicated cam mechanism is provided to pivot each of the shafts individually between an open position, in which the blade extends away from the plane of the disc at an angle of about 40° to that plane, and a closed position, in which the blade lies substantially parallel to the disc. Seeds flow from a hopper into the lowest part of a cylindrical chamber, of which the disc forms one end wall, and the fingers descend successively through the mass of seeds at the bottom of the chamber. As each finger reaches the lowest point in the chamber, the cam mechanism pivots the shaft of that finger so as to move the blade from its open to its closed position, thus (in theory) trapping a single seed between the blade and the adjacent surface of the disc. As the disc rotates, the seed thus trapped is then carried upwardly past a brush which serves to return any excess seeds which may be adhering to the blade back to the bottom of the chamber. As the blade passes its highest point, the cam mechanism returns the blade from its closed to its open position, thus releasing the trapped seed and allowing it to fall through a seed discharge opening provided adjacent to this point.

Although this seed planter is capable of operating at higher metering speeds than the first type of seed planter described above, it is not capable of metering accurately over a wide range of metering speeds. At low metering speeds, less than about ten seeds per second, the number of seeds delivered is less than the theoretical quantity of one seed per finger per revolution. At metering speeds of the order of about 25–30 seeds per second, the number of seeds metered is close to the theoretical amount, while at metering speeds as high as about 40 seeds per second, the amount of seed actually delivered exceeds the theoretical amount, in practice usually by as much as about 50%. The manufacturers recommend that this type of seed planter not be used at tractor speeds above about 5–6 miles per hours (equivalent to a metering speed of about 30 seeds per second), but in practice farmers are inclined to operate the device at considerably higher speeds, thus resulting in considerable overplanting. Not only does this overplanting waste seed, but experiments have shown that overplanting actually reduces crop yields, since if more than one seed is planted in a given spot and two or more seeds germinate in the same spot, all the resultant plants tend to be undersized and relatively unproductive. Furthermore, it will be apparent that, because the amount of seed as a proportion of the theoretical amount varies with the metering speed of this type of seed planter, it is difficult to secure uniform application of seed to a field where working conditions (such as field conditions or gradients) force the operator to vary tractor speed in various parts of the field.

A third commercially-produced type of seed planter comprises a disc-shaped rotor disposed in a vertical plane and carrying around its periphery a series of cups. The cups are arranged so that, on the edge of the rotor which is moving upwardly, the cups are open downwardly. A mass of seeds is disposed in the lowest portion of a seed chamber disposed adjacent one side of the rotor, and seeds are forced into the cups by air pressure. The seeds thus trapped in the cups are carried over the highest point on the rotor and, while the cups are descending, the flow of the air jets is interrupted, thus allowing the trapped seeds to fall from the cups. The chief disadvantage of this type of seed planter is the considerable overplanting which it produces; in practice, if the air jets are made strong enough to ensure that at least one seed is trapped in each cup to provide adequate seed planting, in a large proportion of the cups two, three or even more seeds will be trapped. The resultant overplanting leads to the same problems as described with reference to the second type of seed planter.

All the above types of seed planter also suffer from the problems of timing in delivering their seeds, already discussed above.

Finally, U.S. Pat. No. 3,843,018, of which I am one of the patentees, and ASAE Paper 70–108, of which I am one of the co-authors, describe a seed planter having a rotor comprising a flat disc mounted for rotation about its own axis and having a cylindrical flange extending in one direction from the periphery of the disc. The disc is mounted for rotation in a vertical plane, and four cylindrical depressions are formed in the inner wall of the flange, the axes of the cylindrical depressions being perpendicular to the surrounding portions of the inner wall of the flange. An air supply conduit is connected to the base of each depression and air passed therethrough so that a stream of air passes through the cylindrical depression. A mass of seeds is allowed to flow into the lowest part of a seed chamber disposed adjacent the face of the disc bearing the flange and, as each depression passes the lowest point on the rotor, a single seed is trapped within each depression by the Bernoulli forces developed by the high velocity, low-pressure gas flow developed between the trapped seed and the wall of the depression. The trapped seed is carried past the highest point on the rotor by the depression and, as the seed descends from this highest point, the air flow into the depression is interrupted, thereby allowing the trapped seed to leave the depression and fall through a seed discharge opening provided at an appropriate point adjacent the rotor.

This type of planter provides very accurate metering at low metering rates of about 12 seeds per second. Unfortunately, if an attempt is made to operate the device at the higher metering speeds necessary in conventional practice, it is found that severe underplanting results. Needless to say, this severe underplanting greatly reduces crop yields and thus this type of planter is not suitable for use at the metering rates necessary in conventional agricultural practice. The reasons for this underplanting at high metering speeds have not hitherto been known.

It will thus be seen that there is a need for a seed planter which properly fulfils all the requirements discussed above, and this invention seeks to provide such a planter.

SUMMARY OF THE INVENTION

As a result of extensive experimentation, it has been discovered that the reason why the type of planter described in U.S. Pat. No. 3,843,018 suffers from severe underplanting at high metering speeds is that, as the speed of rotation of the disc increases, there is an increased tendency for seeds lying in contact with the flange to pass straight across the face of the cylindrical depressions rather than falling into the depressions, so that many of the depressions pass through a mass of seeds without having a seed enter thereinto, thus resulting in the aforementioned underplanting. It has been found that providing a ramp surface extending from the surface of the seed into the depression facilitates the entry of a seed into the depression and reduces underplanting. Another reason for the underplanting appears to reside in the cylindrical shape of the depressions in this planter; my experiments have indicated that, although cylindrical depressions will properly retain a seed of one particular size (the size of the seed retained varying, of course, with the diameter of the depression), cylindrical depressions will not firmly retain seed having a range of sizes, and almost all commercially-available seed does vary considerably in size. It has been found that tapering depressions will firmly retain seeds of varying size and thus tapering depressions are to be preferred to cylindrical ones. Thus, my experiments have indicated that the type of planter described in U.S. Pat. No. 3,843,018 can be improved by using tapering depressions incorporating sloping ramp surfaces to facilitate the entry of seeds into the depressions.

Accordingly in one aspect, this invention provides a seed planter comprising a seed transport member having at least one depression therein, this depression being able to accommodate a seed. The deepest portion of the depression in the seed transport member forms a tapering seed retaining section having its narrowest cross-section at its deepest part, this seed retaining section having the form of a solid of revolution having an axis. The walls of the depression also define a ramp surface sloping downwardly from the surface of the seed transport member into the seed retaining section of the depression. The seed transport member is also provided with a gas supply conduit communicating with the seed retaining section of the depression adjacent the deepest part thereof. Besides the seed transport member, the instant seed planter comprises a seed loading station, a seed unloading station and drive means for moving the depression past the seed loading station so that the ramp surface passes the seeds unloading station ahead of the seeds retaining section, and thereafter moving the seed depression past the seed unloading station. Finally, the instant seed planter comprises a gas supply means for passing a stream of gas through the gas supply conduit into the depression as the depression passes the seed loading station and pressurizing means for increasing the pressure within the narrowest part of the seed retaining section of the depression after the depression has passed the seed loading station but not later than the time at which the depression passes the seed unloading station.

In another aspect, the invention provides a planter assembly comprising a frame having a hitch for attachment behind a tractor, a plurality of the instant seed planters mounted on the frame, and a drive connector for connecting the drive means of each of the seed planters to a power source.

Finally, this invention provides a method of picking up and discharging a single seed, which method uses a seed transport member having at least one depression therein, this depression being able to accommodate the seed to be picked up and discharged. The deepest portion of the depression forms a tapering seed retaining section having its narrowest cross-section at its deepest part, this seed retaining section having the form of a solid of revolution. The walls of the depression define a ramp surface sloping downwardly from the surface of the seed transport member into the seed retaining section thereof. The seed transport member is also provided with a gas supply conduit communicating with the seed retaining section of the depression adjacent the deepest part thereof. In the instant method, the depression in the seed transport member is moved past a plurality of seeds so that the ramp surface passes the seeds ahead of the seed retaining section while a stream of gas is passed through the gas supply conduit into the depression, thereby trapping a single seed in the seed retaining section of the depression. The conical depression is then moved away from the remainder of the seeds, thereby separating the trapped seed from the remainder of the seeds, and thereafter the gas pressure within the apical portion of the conical depression below the trapped seed is increased, thereby allowing the trapped seed to leave the conical depression.

DETAILED DESCRIPTION OF THE INVENTION

Figure 1:
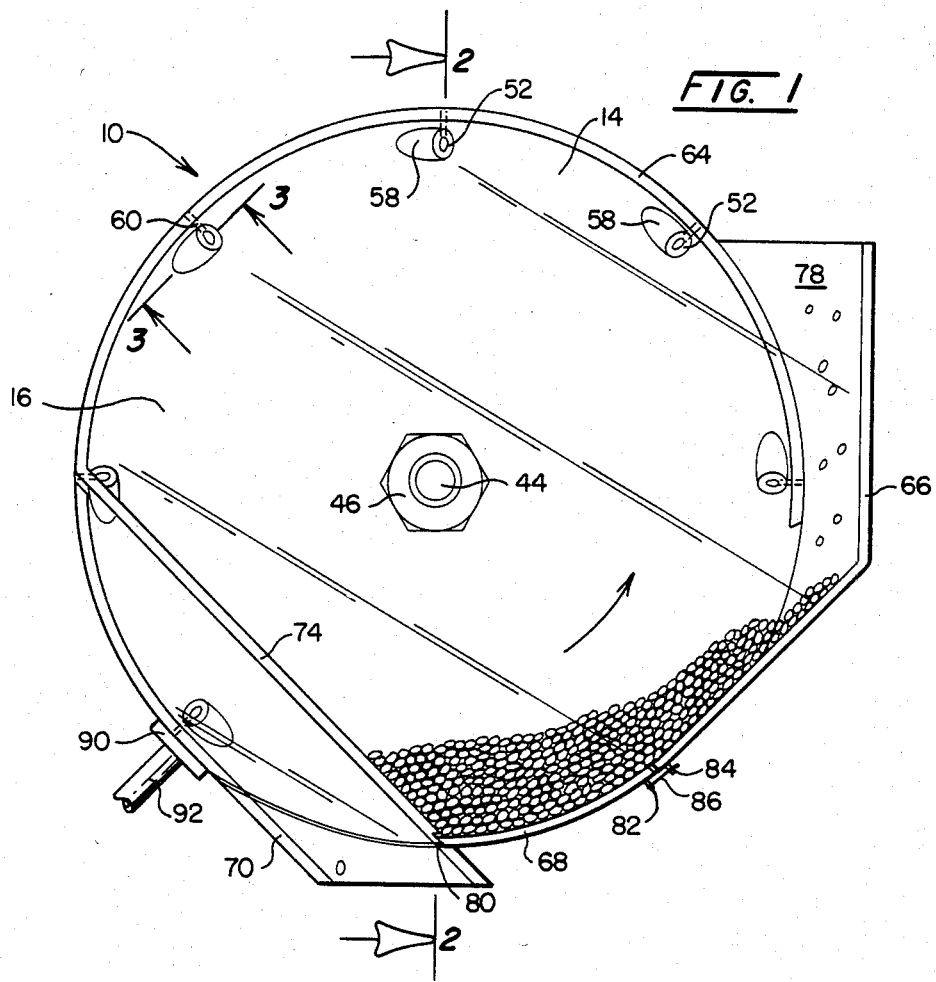
FIG. 1 of the accompanying drawings is a front elevation of a first seed planter of the invention.

The instant seed planter, like that described in the aforementioned U.S. Pat. No. 3,843,018, makes use of Bernoulli's principle to ensure that only one seed at a time is trapped within a single depression in the seed transporting member. Although it may at first seem surprising that a stream of gas issuing from the opening of the gas-supply conduit adjacent the deepest part of the depression will trap a single seed within the depression, rather than blow the seed out of the depression, careful consideration shows that this result is fully consistent with known principles of fluid dynamics. If one considers a substantially spherical seed lodged within a tapering depression having a stream of gas forced thereinto adjacent the deepest part of the depression, it will be apparent that an annular region will exist at which the surface of the seed approaches most closely to the walls of the depression, and that within this annular region the velocity of the gas flow will be larger than in other parts of the depression, since within this region the cross-sectional area through which the gas must pass is very small. Accordingly, within this annular region Bernoulli's principle leads to the conclusion that the gas pressure exerted on the seed will be relatively low, and this low pressure effectively sucks the seed into the depression, thus trapping the seed. Furthermore, it will be apparent that only a single seed can be thus trapped within the tapering depression, since if any further seeds enter the depression they will be unable to enter the relatively narrow region of the depression occupied by the first seed, and thus no corresponding annular region with low gas pressure will be formed between these extra seeds and the walls of the depression and there will be no tendency for these extra seeds to become trapped. In fact, the gas flow out of the depression will tend to blow these extra seeds out of the depression.

The instant seed planter is capable of metering seeds very accurately at high metering rates; for example, the prototype instant seed planter described below with reference to FIGS. 1-3 has only eight depressions in its seed transport member, but is capable of metering soybean seeds at a rate of at least eight seeds per second with an accuracy of better than 99%. As explained in more detail below, this planter can easily be modified to provide about 50 depressions in the seed transport member and as thus modified the planter will be capable of metering 50 seeds per second at a disc rotation rate of 60 revolutions per minute with the same 99+% accuracy.

As already mentioned, it is believed (although the invention is in no way limited by this belief) that the reason why the instant planter is capable of such accuracy at high metering rates, although the somewhat similar seed planter described in the aforementioned U.S. Pat. No. 3,843,018 produces severe underplanting at high metering rates, is that the ramp surface of the instant seed planter facilitates the entry of a seed into the depression; although this phenomenon has not previously been described in the literature, it appears that, at high metering rates, seeds do not have adequate time to enter the depressions in the seed planter described in U.S. Pat. No. 3,834,018 as the depression passes through the mass of seeds fed to the seed planter.

Both the overall shape of the seed transport member and the shape of the depressions therein can vary greatly. For example, the seed transport member could have the form of a cylinder with the depressions arranged on its cylindrical surface in a single plane perpendicular to the axis of the cylindar, or several rings of depressions could be provided, each ring lying in a single plane perpendicular to the axis of the cylinder and the various rings being spaced from one another along the length of the cylinder. However, an instant seed planter incorporating such a cylindrical seed transport member would tend to have an undesirably large width, and accordingly it is preferred that the seed transport member of the instant planter have the form of a disc with the seed-carrying depressions being formed in one circular face of this disc and arranged in one or more rings centered on the axis of the disc.

So long as the seed retaining section of the or each depression is tapered so that it can retain seeds varying considerably in size, the exact shape of the seed retaining section is not crucial; for example, the seed retaining section could have the form of an ellipsoid, paraboloid or hyperboloid of revolution, or could be hemispherical. However, it is preferred that the seed retaining portion of the depression be substantially conical in form since a conical seed retaining portion is easy to form and provides good holding characteristics for seeds having a considerable range of sizes. In a particularly preferred form of the instant seed planter, the retaining portion comprises a conical depression the apical portion of which is modified so as to be substantially hemispherical in shape. The provision of such a hemispherical apical portion in a conical depression increases the holding force exerted by the air flow of a trapped seed and also assists in holding seeds of a wider size range. The hemispherical portion also reduces the variation in position of the low pressure region with variations in size of seed and thus assists the removal of the trapped seed when such removal is affected by an auxiliary air jet (as described in more detail below); obviously the injection of air into the low pressure region from a fixed opening will be more effective if the position of the low pressure region does not vary very much with the size of seed.

When a conical seed retaining portion is used, the proper operation of the instant seed planter is affected by the apical angle of the cone. Although the optimum apical angle appears to vary somewhat with variations in the speed of movement of the surface of the conical depression (i.e. with the rate of rotation of the disc where the preferred form of seed transport member comprising a disc having depressions arranged on one circular face is used), it has been found that when using a seed transport member in the form of a twelve inch disc rotating at about 60 rpm., the apical angle should lie within the range of 70° to 110°, the optimum value being about 90°. With a conical seed retaining portion, the gas supply conduit desirably extends substantially along the axis of the conical depression; this arrangement ensures that the gas flow through the gas supply conduit and out through the conical depression is substantially uniform across the cross-sectional area of the conical depression and thus that a uniform suction is obtained all around a seed trapped therein.

The portion of the depression which contains the ramp surface may be discrete from the seed retaining section of the depression. For example, when the seed transport member has the preferred form of a disc with a plurality of apertures arranged in a ring on one circular face of the disc, an annular groove may be cut in the disc passing through all the depressions, in which case the ramp surface will be constituted by surfaces leading from the surface of the disc down into the groove (once the seed has slid down a ramp surface into a depression, a flat portion interposed between the bottom of this ramp surface and the seed retaining portion of the depression does not appear to affect the operation of the device; presumably, when the seed planter is being operated and the depression is being carried through a mass of seeds, the mass of seeds will itself drag any seed which has once entered the depression along the flat portion into the seed retaining portion of the depression). Alternatively, the seed retaining portion of each depression can have the form of a right cone having its axis perpendicular to the surrounding surface of the seed transport member and having on one side a wedge-shaped extension, the bottom of this wedge-shaped extension forming the ramp surface. However, for ease of formation it is preferred to use a depression such that the ramp surface is simply an extension of the seed retaining section. In particular, the preferred form of the depression comprises a conical depression the axis of which is not perpendicular to the surrounding surface of the seed transport member so that the part of the surface of the cone which forms the smallest angle with the surrounding surface of the seed transport member in effect forms an elongate extension of the fully conical portion of the depression and provides the necessary ramp surface. For example, in the first instant seed planter described below with reference to FIGS. 1-3, each conical depression has the form of a cone having an apical angle of 90° and its axis at an angle of 60° to the plane of the surrounding flat face of the seed transport member, so that part of the surface of the cone lies at an angle of only 15° to the surrounding surface of the seed transport member, thus forming the necessary ramp surface. Forming the depression in this manner so that the conical surface of the depression itself provides the ramp surface greatly simplifies the manufacture of the seed transport member, since the conical depression can be formed by a simple drilling operation, thus avoiding the need for first drilling the seed retaining section of the depression and thereafter milling a separate extension of the depression to provide the necessary ramp surface.

The optimum angle of slope of the ramp surface appears to vary somewhat with the speed of movement of the seed transport member past the seed loading station; in general, as the speed of movement of the seed transport member past the seed loading station increases the optimum angle of slope of the ramp surface decreases i.e. the ramp surface should be lengthened, in order that a seed at the seed loading station may have sufficient time to slide down the ramp surface into the seed retaining portion of the depression. In most cases, the angle of slope should not exceed about 30°, since higher angles tend to create underplanting problems at high metering speeds, and the preferred angle of slope of the ramp surface is 10°-20°. In the specific preferred planter previously mentioned, in which the seed transport member has the form of a twelve inch (30 centimeter) disc which is rotated at about 60 rpm., the optimum angle of slope for use with soybean seeds is about 15°.

When the seed transport member has the form of a disc with one or more conical depressions formed in one circular face of this disc, the ramp surfaces of the depressions should in theory extend along an arc of a circle centered on the axis of the disc, so that a seed entering the ramp surface as the disc rotates past a mass of seeds does not need to move radially of the disc as it slides down the ramp surface into the depression. However, in practice it has been found that, provided that the angle of slope of the ramp surface is not substantially less than about 15°, so that the length of the ramp surface is not excessive, no deleterious effects in the operation of the planter are produced by extending each ramp surface from its associated seed retaining section along a tangent to a circle concentric with the disc. Naturally, it is easier to form a linear ramp surface, which may often be formed by a simple drilling operation as previously described, rather than having to mill a curved ramp surface.

Where the instant seed planter is operating, its drive means passes the depression through a mass of seeds adjacent the seed loading station as the gas supply means passes a stream of gas through the gas supply conduit into the depression, so that a single seed becomes trapped in the seed retaining section of the depression and is carried by the movement of the seed transport member away from the seed loading station, thus separating the single trapped seed from the remainder of the mass of seeds. Although the gas supply means must pass gas into the depression as the depression passes the seed loading station, in order to ensure that only a single seed becomes trapped in the depression, it is not absolutely essential that the flow of gas be continuous all the time the seed is being carried by the seed transport member from the seed loading station to the seed unloading station. For example, for part of its journey from the seed loading station to the seed unloading station, the seed might be held in the depression by gravity or by some form of mechanical retaining means. However, it is preferred that the gas supply means pass the stream of gas continuously through the gas supply conduit into the depression as the drive means carries the depression from the seed loading station to the seed unloading station and that the pressurizing means increase the pressure within the narrowest part of the seed retaining section only when the depression lies adjacent the seed unloading station. This arrangement ensures that the seed is firmly retained by the Bernoulli forces within the seed retaining section of the conical depression during its entire journey from the seed loading station to the seed unloading station. This greatly reduces the likelihood that the seed might accidentally be displaced from the depression by vibration, and eliminates the need for any mechanical retaining means, which only complicates operation of the apparatus. Since, in this preferred form of seed planter, the retention of the trapped seed within the depression is effected independently of gravity, the seed transport member may be disposed at whatever angle to the vertical is convenient for optimum operation of the device. In particular, when the preferred type of seed transport member comprising a disc having depressions in one circular face thereof is used, this disc is desirably disposed in a vertical plane and the drive means is arranged so that the depressions are moved upwardly past the seed loading station and the seeds there trapped within the depressions carried across the highest part of the disc and downwardly past the seed unloading station. This arrangement minimizes any tendency for surplus seeds to cling to the surface of the seed transport member by gravity, thus ensuring that only the proper number of seeds are transported by the seed transport member.

The operation of the instant seed planter consumes only relatively small amounts of gas which need only be at relatively low pressures. For example, in the first instant seed planter described below with reference to FIGS. 1-3, the gas supply conduits have the form of bores 0.04 inches (one millimeter) in diameter and the planter can be operated satisfactorily using gas supplies having pressures of about two to about ten psig., the optimum value for use with soybean seeds being about five psig. It will be appreciated from the wide range of operating pressures usable that the operation of the instant planter is not greatly affected by fluctuations in gas supply pressures.

The pressurizing means of the instant seed planter serves to increase the gas pressure within the narrowest part of the seed retaining portion after the depression has passed the seed loading station but not later than the time at which the depression passes the seed unloading station. As already mentioned, it is preferred that the gas supply means continue passing the stream of gas into the depression, and thus generating the necessary retaining force to hold the trapped seed within the depression, during the whole time that the depression is carrying the trapped seed from the seed loading station to the seed unloading station; consequently, it is preferred that the pressurizing means only increase the pressure within the narrowest part of the seed retaining section as the depression lies adjacent the seed unloading station. Obviously, the increase in pressure caused by the pressurizing means destroys the suction effect which traps the seed in the depression, thereby permitting the seed to leave the depression at the seed unloading station. In fact, it is preferred that the pressurizing means be arranged to create an above ambient pressure in the narrowest part of the seed retaining depression as the seed passes the seed unloading station, so that this above ambient pressure forcibly ejects the trapped seed from the depression at the seed unloading station; such forcible ejection of the seed avoids timing errors which may result when the seed is simply allowed to fall from the depression under gravity. Any convenient form of pressurizing means may be employed; for example the pressurizing means may interrupt the flow of gas to the gas supply conduit. Alternatively, the pressurizing means may take the form of an auxiliary gas supply conduit communicating with the depression at a point spaced from the intersection of the gas supply conduit and the depression, together with a means for passing gas under pressure through this auxiliary gas supply conduit into the depression. Since the gas passed through the auxiliary gas supply conduit is actually intended to raise the pressure within the annular region where the surface of the trapped seed most closely approaches the walls of the depression, it is desirable that the outlet of the auxiliary gas supply conduit lie within this annular region or closely adjacent this annular region on the side thereof towards the deepest part of the depression. This obviously means that the optimum positioning of the outlet of the auxiliary gas supply conduit will vary with the diameter of the seed being trapped, but it is believed that those skilled in the art will have no trouble determining the optimum position of the auxiliary gas supply conduit by routine empirical tests. Furthermore, as mentioned above, variation in the position of the low pressure region can be minimized by providing a conical seed retaining section of the depression, this conical seed retaining section having a hemispherical portion adjacent its apex.

In the instant seed planters using rotatable discs as the transport members, a single planter may be provided with two similarly-sized spaced discs having a chamber therebetween containing seeds. Obviously such a planter can plant twice as many seeds as a corresponding single-disc planter, yet can still be made of relatively small width.

Since the proper operation of the instant seed planter requires the formation of the aforementioned annular region of low gas pressure where the surface of a trapped seed most closely approaches the walls of the depression, it will be apparent that the efficacy of the instant seed planter will vary with the shape of the seed being planted. Although the instant seed planter is primarily intended for substantially spherical seeds, such as soybean seeds or coated sugar beet seeds, some variation in the shape of the seed can be tolerated. For example, the instant seed planter can handle somewhat ellipsoidal seeds which will form the necessary low pressure annular region. However, the instant seed planter is not well adapted for handling very flattened seeds, such as seed corn or cucumber seeds, since flattened seeds do not allow for the proper formation of the low pressure annular region. Accordingly, the instant seed planter should not be used to plant such flattened seeds. Indeed, it has been found that if a mixture of substantially spherical and nonspherical seeds is fed to the instant seed planter, the seed planter will selectively pick up the substantially spherical seeds from the mixture and only spherical seeeds will be discharged at the seed unloading station. Thus, not only will the instant seed planter tend to reject foreign seeds when in normal use in planting, but also the instant planter can be used as a seed sorter to separate desired substantially spherical seeds from undesirable weed and other seeds. In particular, I have found that if a quantity of pea seeds containing some bad, wrinkled seeds is fed to the instant seed planter, only the good, unwrinkled seeds will be passed through the planter, the bad, wrinkled seeds being left in the bottom of the seed planter, from which they may be removed by means of an appropriate waste removal opening. A seed planter capable of metering flat seeds with accuracy is disclosed and claimed in the co-pending application of Holmes and Shearer, Ser. No. 434,267, of even date herewith, entitled "Seed Planter, Planter Assembly and Method of Picking Up and Discharging Single Seeds."

In the preferred form of the instant planter assembly wherein the seed transport members of the various seed planters have the form of vertical discs, the drive means and the drive connection means are preferably arranged such that, when the frame is being moved forwardly by a tractor, the lowest point on each disc is moving rearwardly relative to the frame with a velocity approximately equal to the velocity at which the frame is being moved forwardly by the tractor, so that the lowest point on each disc is substantially stationary relative to the ground beneath it. Since the seeds discharged from the seed planters leave the planters adjacent the lowermost point on each disc, the discharged seeds will have little or no horizontal velocity relative to the ground and will thus fall vertically downwardly from the planter assembly. Such vertical movement of the discharged seeds helps to reduce the timing difficulties already referred to above and caused by collisions between the discharged seeds and various parts of prior art planters.

In the instant planter assembly, preferably the drive means of each seed planter comprises a belt (a term which is used herein to include a drive chain), a plurality of these belts being driven from a common drive shaft mounted on the frame and extending transversely to the direction in which the assembly is carried by a tractor. Also, desirably the seed planters are movable transversely relative to the frame, thereby enabling the spacing between the rows of seeds planted by the seed planters to be varied.

Figure 3:
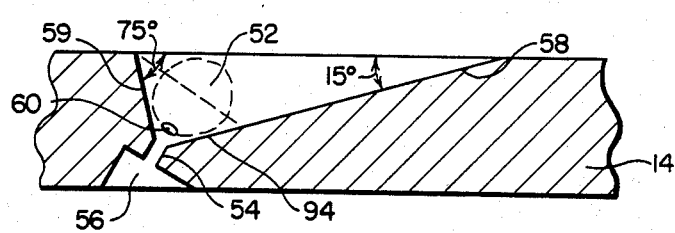
FIG. 3 is an enlarged cross-section through the seed transport member of the first seed planter along the line 3—3 in FIG. 1.
Figure 2:
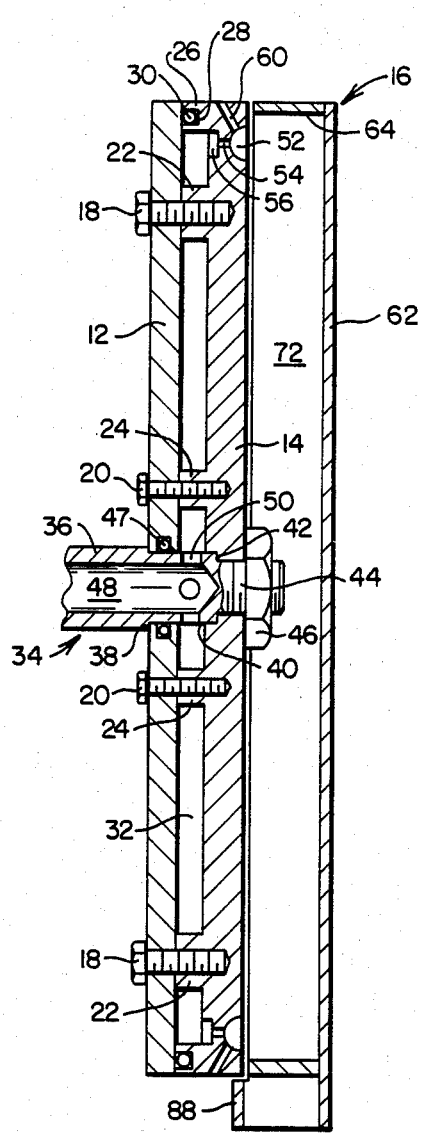
FIG. 2 is a section through the first seed planter along the line 2—2 in FIG. 1.

The first instant seed planter (generally designated 10) shown in FIGS. 1-3 of the accompanying drawings comprises three main components, namely a back plate 12 (FIG. 2), a seed transport member in the form of a disc 14 and a front plate 16. The back plate 12 is secured to the disc 14 by two sets of bolts, namely a first set of eight bolts 18 (only two of which are visible in FIG. 2) arranged at regular intervals around the disc adjacent its periphery, and a second set of four bolts 20 arranged at regular intervals around the disc adjacent its center. The bolts 18 and 20 are engaged in screw threaded apertures provided the disc 14, and the rear face of the disc 14 is provided with two sets of integral, upstanding cylindrical spacers 22 and 24 which extend rearwardly from the rear face of the disc 14, surround the bolts 18 and 20 respectively and contact the front face of the back plate 12. Also, the disc 14 is provided with an integral flange 26 which extends rearwardly from the rear face of the disc 14 all around the periphery thereof and contacts the front face of the back plate 12. A groove 28, of square cross-section, is cut in the rear face of the flange 26 along the whole length thereof, and an O-ring 30 of resilient rubber is disposed within the groove 28 to form a seal between the back plate 12 and the disc 14. As shown in FIG. 2, apart from the rear faces of the spacers 22 and 24 and the rear face of the flange 26, the rear face of the disc 14 is not in contact with the front face of the back plate 12, but is spaced therefrom by a distance equal to the common length of the spacers 22 and 24 and the flange 26, thus forming an air plenum 32 between the back plate 12 and the disc 14. (Although this is not apparent from FIG. 2, the spacers 22 and 24 have the form of annular cylinders, so that each of the bolts 18 and 20 is surrounded by a discrete spacer and thus the air plenum 32 forms a single connected space.)

A shaft 34 passes through both the back plate 12 and the disc 14. The shaft 34 comprises three sections differing in diameter, namely a rearward section 36 which lies rearwardly of the rear face of the back plate 14 and terminates at a shoulder 38 which abuts the rear face of the back plate 12, a central section 40, which is of smaller diameter than the rearward section 36, passes through the back plate 12 and the air plenum 32 and into a cylindrical recess formed in the rear face of the disc 14, and terminates in a shoulder 42, and a forward section 44 which passes through an axial bore in the disc 14, extends forwardly from the front face of the disc 14 and is provided at its forward end with a thread which is engaged with a nut 46, which itself engages the front face of the disc 14. A O-ring 47 is disposed in a groove cut in the back plate 14 and encircles the central section 40 of the shaft 34; this O-ring 47 helps to prevent air leakage from the air plenum 32 through the back plate 14 around the shaft 34. The shoulder 38 and the nut 46 prevent relative rotation between the shaft 34 and the disc 14, so that when the shaft is rotated by a suitable prime mover (not shown in FIGS. 1-3), for example an electric motor, the back plate 12 and the disc 14 rotate with the shaft 34.

The rearward and central sections 36 and 40 respectively of the shaft 34 are provided with an axial bore 48 which is connected to a compressed air source (not shown). Four apertures 50 are provided in the central section 40 of the shaft 34; these apertures 50 establish fluid communication between the axial bore 48 and the air plenum 32, so that compressed air injected into the bore 48 will pass through the apertures 50 and maintain the air within the air plenum 32 under pressure.

As shown in FIGS. 1 and 3, the disc 14 has eight seed transport stations spaced at intervals of 45° adjacent the periphery of its front face and arranged on a circle coaxial with the disc 14. As best seen in FIG. 3, each seed transport station comprises a depression 52, a gas supply conduit in the form of a bore 54 and a countersink 56. The depression 52 has the form of part of a cone having an apical angle of 90° and having its axis at an angle of 60° to the plane of the front face of the disc 14; the axis of each depression 52 lies in a plane perpendicular to a line joining the deepest point of the depression 52 and the axis of the disc 14. Because the axis of the cone is thus at an acute angle to the plane of the disc 14, one part of the wall of the conical depression 52 forms a ramp surface 58 which slopes downwardly from the front surface of the disc 14 to the deepest part of the depression 52 at an angle of 15° to the surrounding surface of the front face of the disc 14. The part of the wall of the depression 52 opposite the ramp surface 58 provides a stop surface 50 extending at an angle of 75° to the surrounding surface of the disc 14. This stop surface performs the important function of preventing a seed which has slid down the ramp surface 58 into the conical depression sliding out of the depression 52 before the seed has had a chance to reach its equilibrium position in the air flowing through the depression from the bore 54. The depth of the depression 52 is adjusted so that a seed (not shown in broken lines in FIG. 3) resting within the depression 52 has its uppermost point lying just below the surrounding surface of the disc 14. Although a slight protrusion of the seed out of the depression 52 can be tolerated, it is important that a seed resting within the depression 52 not protrude too far therefrom, or there may be a tendency for a seed which has once entered the depression 52 to be pulled therefrom by friction caused by other seeds as the depression 52 is carried by the disc 14 through the mass of seeds; if the seed does thus tend to be pulled from the depression 52, the accuracy of metering of the seed planter may be reduced.

It will be seen that the angled conical form of the depression 52 is in effect a combination of two different sections, the division between the sections being indicated by a broken line in FIG. 3. The deepest part of the depression 52 below the broken line is a completely conical seed retaining section which accommodates the seed, while the part of the depression 52 above the broken line in FIG. 3 performs a substantially wedge-shaped seed entry section providing the ramp surface 58 down which a seed can roll or slide to reach the seed retaining section of the depression.

As best seen in FIG. 1, the ramp surfaces 58 extend along tangents to the circle on which the depressions 52 lie in a direction such that, when the disc 14 is in operation and is being rotated by the shaft 34 in the direction shown by the arrow in FIG. 1, the ramp surface 58 passes ahead of the deepest part of the depression 52. The depression 52 has a maximum width radially of the disc 14 of ¾ of an inch (19 mm.) and a maximum length of 1 1/6 inches (27 mm.). The bores 54 are 0.040 inches (1 mm.) in diameter. Strictly speaking, the ramp surfaces 58 should be formed along arcs of the circle on which depression 52 lie, in order to ensure that, as each ramp surface is passing a mass of seeds and one seed is passing down the ramp surface 58 into the depression 52, the seed does not need to move radially of the disc 14. However, the formation of curved ramp surfaces involves rather complicated milling operations, and with depressions having the dimensions already given it has been found that no adverse effects upon the operation of the seed planter are produced by forming the ramp surfaces straight and extending along a tangent to the aforementioned circle. Such straight ramp surfaces are of course much easier to form than curved ramp surfaces since the straight ramp surfaces can be formed by a simple drilling operation.

Each gas supply conduit or bore 54 extends from the lowest point (in FIG. 3) of the depression 52 along the axis of that depression, while the countersink 56 has the form of part of a cylinder, ⅜ of an inch (8 mm.) in diameter and coaxial with the axis of the conical depression 52. Thus, the bore 54 and the countersink 56 together establish fluid communication between the lowest point of the depression 52 and the rear face of the disc 14. Accordingly, when the air plenum 32 is pressurized via the bore 48 and the apertures 50 in the manner previously described, air will flow through the countersink 56 and the bore 54 and issue into the lowest point of the depression 52.

An auxiliary gas supply conduit in the form of a bore 60 extends radially inwardly from the outer cylindrical surface of the disc 14 into each depression 52. As shown in FIG. 3, the radially inward end of each bore 60 opens into the depression 52 at a point spaced from the apex thereof; in fact, the radially inward end of the bore 60 terminates adjacent the point of nearest approach of a seed (shown in broken lines in FIG. 3) to the walls of the depression 52, for reasons which will be explained in more detail below.

The front plate 16 of the first seed planter shown in FIGS. 1–3 comprises a circular face plate 62 of the same size as, and coaxial with, the disc 14, and four flange members, each of which extends rearwardly from the rear face of the face plate 62 at right angles thereto. The flange members comprise a main flange member 64, a seed inlet flange member 66, a seed trap flange member 68 and a seed discharge flange member 70. The rear edges of these four flange members are disposed adjacent the corresponding parts of the front face of the disc 14; for reasons described below, it is not necessary to form a seal between the rear edges of the flange members and the front face of the disc 14, but the gap between the flange members and the disc must be sufficiently small to prevent seeds passing between them. The four flange members, the face plate 62 and the front face of the disc 14 together define a seed cavity 72 (FIG. 2) into which the seeds to be planted are fed.

The main flange member 64 surrounds the upper half of the seed cavity 72 and has a lower extension 74 which has the form of a flat plate extending downwardly at 45° from one end of the main portion of main flange member 64. The seed inlet flange member 66 has a vertical portion which lies radially outwardly of the adjacent end of the main flange member 64, and a lower portion extending downwardly at an angle of 45° from the vertical portion of the seed inlet flange member 66, beneath the adjacent end of the main flange member 64. The extreme lower end of the seed inlet flange member 66 is bent to form part of the surface of the same cylinder defined by the main portion of the main flange member 64. The vertical portion of the seed inlet flange member 66, the adjacent part of the main flange member 64, and extension pieces provided on the face plate 62 and a similar rear plate 66 together define a seed inlet channel 78. Seed from a hopper (not shown) positioned above the seed inlet channel 78 passes down this channel and through an opening between the lower end of the main flange member 64 and the second portion of the seed inlet flange member 66 into the seed cavity 72. To prevent blockages of seed in the channel 78, the narrowest part of this channel should not be less about ¾ inch (19 mm.) wide.

The seed trap flange member 68 has the form of an arc of the cylinder defined by the main flange member 64. One end of the seed trap flange member 68 is retained in, and pivotable within, a groove 80 formed in the lower end of the lower extension 74 of the main flange member 64. The opposed end of seed trap flange member 68 abuts the lower end of the seed inlet flange member 66; cylindrical detents 82 and 84 respectively are provided adjacent the abutting edges of the seed trap flange member 68 and the seed inlet flange member 66 respectively, and a connector 86 connects these two detents, thereby holding the edges of the seed trap flange member 68 and the seed inlet flange member 66 in abutment. When it is desired to empty the seed cavity (for example to remove seed debris which has accumulated therein), the connector 86 is released from the detent 84, thus allowing the seed trap flange member 68 to be pivoted downwardly and the contents of the seed cavity 72 removed.

The seed discharge flange member 70 has an upper curved portion, which forms part of the cylinder defined by the main flange member 64, and a flat lower portion which extends parallel to the lower extension 74 of the main flange member 64. The lower extension 74, the seed discharge flange member 70, the front face of the disc 14 and a rear plate 88 lying below the disc 14 together define a seed discharge conduit, through which seeds are discharged from the seed planter 10.

For reasons which will be explained in more detail below, a seed discharge means is disposed radially outwardly of the disc 14 adjacent the seed discharge flange member 70. This seed discharge means comprises an arcuate plate 90, which is separated from the cylindrical outer surface of the disc 14 by a small clearance, and a gas supply conduit 92, which is connected to a source of pressurized air (not shown). The bore within the conduit 92 extends through the plate 90, which is disposed so that the air jet issuing from the gas supply conduit 92 through the plate 90 impinges directly upon the outer ends of the bores 60 as they pass the plate 90.

The seed planter 10 operates as follows. As already mentioned, seeds from a hopper (not shown) pass down the seed inlet channel 78 and into the seed cavity 72 lying adjacent the front face of the disc 14. As the disc 14 is rotated by the shaft 34 in the direction shown by the arrow in FIG. 1, the depressions 52 pass successively through the mass of seeds lying in the lowest portion of the seed cavity 72, the ramp surface 58 of each depression 52 passing through the mass of seeds ahead of the apical portion of the depression. The stream of air passing through the axial bore 48 in the shaft 34, the apertures 50, the air plenum 32, the countersink 56 and the bore 54 emerges at the lowest point of the depression 52 and traps a single seed in the lowest part of this depression. The seed is actually retained within the depression by the low pressure in an annular region 94 where the surface of the substantially spherical seed approaches most closely to the walls of the depression 52. Since the cross-sectional area for airflow is at its smallest in the annular region 94, the velocity of the airflow is at a maximum in this region and the air pressure correspondingly at a minimum. (It will be appreciated that the air entering the seed cavity 72 via the depressions 52 can leave this cavity both via the seed inlet channel 78 and via the small gap between the rear edges of the flange members 64, 66, 68, and 70 and the front face of the disc 14. It is for this reason that no seal is required between the front face of the disc 14 and the flange members.)

The single seed thus trapped within each depression 52 is then carried upwardly out of the mass of seeds, around the upper half of the disc 14 adjacent the main flange member 64 and ultimately past the lower section 74 of the main flange member 64, which separates the seed cavity 72 from the seed discharge channel. As the depression 52, with the single seed trapped therein, passes the plate 90, the air jet issuing from the gas supply conduit 92 passes through the bore 60 associated with the depression 52 and issues into the depression 52 adjacent the annular region 94. This injection of air into the annular region 94 increases the air pressure therein, thus destroying the low pressure region which trapped the seed within the depression 54 and allowing the seed to fall down the seed discharge conduit.

The apparatus shown in FIGS. 1-3 operates very satisfactorily with the disc 14 rotating at 60 revolutions per minute; the accuracy at this speed is better than 99%. Since the planter has only eight depressions 52, at 60 revolutions per minute the planter is only metering eight seeds per second. However, it will be seen from FIG. 1 that the depressions 52 are arranged in a single ring and that they are widely spaced from one another. By arranging further depressions within the same ring in the large spaces left between the existing depressions 52, and by arranging a further ring of depressions radially inwardly of the existing depressions 52 and positioned midway between the depressions 52, the disc 14 can accommodate approximately 48 depressions. This modified form of the planter shown in FIGS. 1-3 would be capable of metering 48 seeds per second with high accuracy at a disc speed of only 60 revolutions per minute.

The various parts of the planter shown in FIGS. 1-3 can be constructed of any suitably rigid materials. In the first experimental prototype, the disc 14 was formed from an aluminum block, the shaft 34 from steel and the back plate 12 and the front plate 16 from a transparent plastic material. However, for commercial use it would be advantageous to form the back and front plates 12 and 16 respectively from steel, aluminum or some other suitable tough, rigid material in order to make them less fragile under the somewhat difficult conditions encountered in commercial agricultural use.

Figure 4:
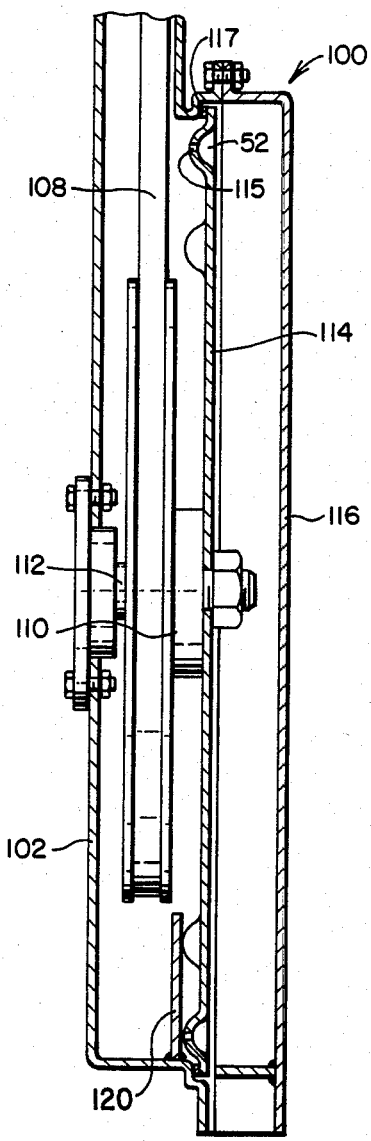
FIG. 4 is a section, similar to that of FIG. 2, through a second seed planter of the invention along the line 4—4 in FIG. 5.
Figure 5:
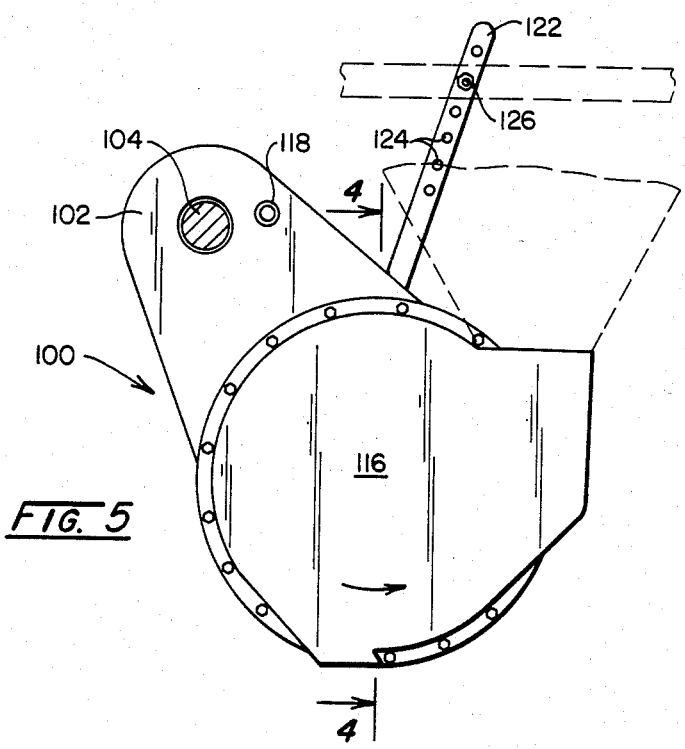
FIG. 5 is a front elevation of the second seed planter shown in FIG. 4.

The second instant planter 100 shown in FIGS. 4 and 5 operates in substantially the same manner as the first planter shown in FIGS. 1-3 but differs therefrom in a number of mechanical details. This second planter comprises a belt housing 102 through which passes a drive shaft 104 (FIG. 5). As described in more detail below with reference to FIG. 6, the single drive shaft 104 can be used to power a plurality of planters arranged parallel to one another. A drive sprocket (not shown) is splined onto the drive shaft 104 and a cog belt 108 transmits power from the drive sprocket to a driven sprocket 110. (A drive chain could be substituted for the belt 108, but the use of a drive chain is disadvantageous under field conditions since such a chain must be lubricated and dust, earth and the like tend to adhere to the lubricant and foul the chain). This driven sprocket 110 is integral with a shaft 112 which is rotatably mounted in the rear face of the housing 102. A seed transport member having the form of a stamped plate 114 is fixedly mounted on the shaft 112 so as to be coaxial with the sprocket 110. The plate 114 has been stamped to form two rings of conical depressions 52 therein, these conical depressions being identical to those in the disc 14 in FIGS. 1-3, except that owing to the thinness of the plate 114 it is not necessary to bore gas supply conduits similar to those designated 54 in FIG. 3; instead, the stamping of the plate 114 is simply arranged to create small apertures 115 in the lowest parts of the conical depressions 52. The depressions 52 in each of the two rings are staggered with respect to the depressions in the other ring such that seeds are picked up and discharged by the plate 114 at regular intervals. The plate 114 closes a circular aperture in the front face of the housing 102, and a sealing member 117 formed of self-lubricating plastic is fitted to the edge of the circular aperture in the housing 102 so as to make sealing contact with the rear face of the plate 114. (Alternatively, the sealing member 117 may be provided on a flange extending in front of plate 114; this has the advantage that the air pressure behind the plate 114 (see below) will tend to force the plate into engagement with the seal). A hollow tube 118 (FIG. 5) is provided in the housing 102 to provide fluid communication between the interior of the housing 102 and a compressed air source (not shown). Thus, the whole interior of the housing 102 to the rear of the plate 114 acts as an air plenum to supply air under pressure to the rear face of the plate 114.

The front face of the plate 114 is covered by a front plate 116 which is substantially similar to that shown in FIGS. 1-3 except that the periphery of the plate 116 is bolted to the adjacent part of the housing 102. However, since no auxiliary gas supply conduits corresponding to the bores 60 shown in FIG. 1 can be formed in the plate 114 shown in FIGS. 4 and 5, the plate 90 and the gas supply conduit 92 are omitted from the second planter and a different type of seed release means is used. This seed release means takes the form of a seed release plate 120 fixed to the housing 102 so as to lie closely adjacent the rear face of the plate 114 on the opposed side thereof from the seed discharge channel. The seed release plate 120 is disposed such that, as each conical depression 52 passes the plate 120, that plate contacts the rear face of the plate 114 surrounding the aperture in the lowest part of the conical depression 52, thus closing the aperture, interrupting the air flow therethrough and permitting the trapped seed to leave the conical depression 52 and exit the planter via the seed discharge channel. The seed release plate 120 is made of a resiliently deformable material so that it can move toward and away from the plane of the plate 114 in order to accommodate slight irregularities in the formation of the plate, and in particular in the shape of the depressions 52 therein. The plate 120 may be replaced by a roller capable of rotating about a vertical axis; the roller can be made of a deformable material to accommodate to variations in shape of the plate 114 and also has the advantage that its operation is less likely to be interfered with by dust, dirt and other debris which inevitably accumulates in the lowest part of the housing 102 adjacent the plate 120 when the planter is used under field conditions. If desired, the lowest part of the housing may be provided with a releasable door or other means for discharging such debris therefrom in order to prevent malfunction of the planter.

In order to ensure the greatest accuracy in timing the arrival of the seeds at the planting location, it is desirable to use the seed planter as close to the ground as possible; in fact the lowest part of the planter when in use is disposed within the furrow cut to receive the seeds in order that the seeds may have the shortest possible distance to fall from the planter into the furrow. Accordingly, to allow for differences in furrow depth, the second instant seed planter shown in FIGS. 4 and 5 is arranged to pivot about the drive shaft 104. To enable the housing to be locked in a variety of positions, a bar 122 is pivotally mounted upon the upper face of the housing 102 and a plurality of bores 124 are provided passing through the bar 122. A bolt 126 can be passed through any selected one of the bores 124 and through a similar bore in a frame member (shown in broken lines in FIG. 5) and then secured in position by means of a nut (not shown); the frame member forms part of the planter assembly on which the planter is mounted.

It will be seen that the second instant seed planter shown in FIGS. 4 and 5 can be made of relatively small width (the width of the planter being its maximum dimension parallel to the axes of the shafts 104 and 112) since the belt drive to the sprocket 110 avoids the need for any lengthy, transversely extending shaft. In practice, the width of this seed planter can be made as small as about 1½ or 2 inches, so that when a plurality of seed planters are disposed side by side on a planter assembly the planters can plant seeds in rows with as little as about 2 inches between adjacent rows. This allows for planting rows more closely than can be achieved with conventional seed planters and provides a row spacing which will satisfy the optimum requirements for planting all commercial crops. Since the seed planter can be made so narrow, a single row of planters on a planter assembly will suffice, thus avoiding the complications when a plurality of rows of staggered planters are required to achieve small spacings between rows.

Moreover, the very small width of the planter allows it to be used in a double disc furrow opener planter with the planter disposed between the two discs.

Figure 6:
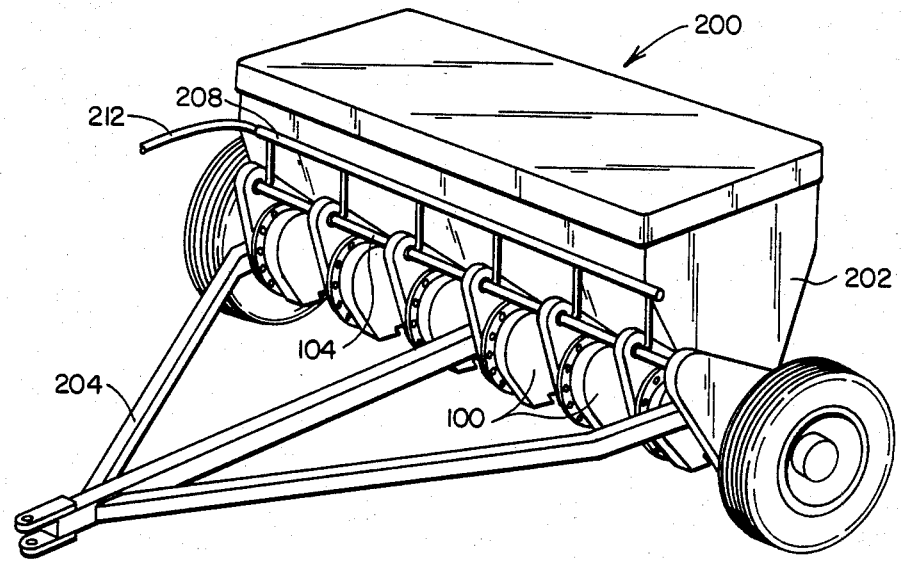
FIG. 6 is a perspective front three-quarter view of a planter assembly of the invention incorporating a plurality of the instant second seed planters as shown in FIGS. 4 and 5.

Apart from the use of the second instant seed planter shown in FIGS. 4 and 5, the construction of the instant seed planter assembly 200 shown in FIG. 6 is fairly conventional. The seed planter comprises a frame 202 provided with a hitch 204 by means of which the planter is towed behind a tractor. The frame carries a plurality of seed planters 100 identical to those shown in FIGS. 4 and 5, these planters being arranged in a single row extending transversely across the frame and being driven from a single drive shaft 104. The drive shaft 104 is itself driven from one of two wheels unnumbered which contact the ground. As in conventional planters, the use of a drive from a freely rotating wheel ensures that the rate of rotation of the seed transport members in the planter is exactly proportional to the rate of movement of the planter across the ground, thus ensuring uniform spacing between adjacent seeds regardless of planter speed. Also, the drive mechanism by which the discs of the seed planters are driven from the wheels of the planter is so arranged that, when the planter assembly is being towed forwardly by a tractor, the lowest point on each disc is moving rearwardly relative to the frame 202 with a velocity equal to that at which the frame is being towed forwardly by the tractor, so that the lowest point on each disc is stationary relative to the ground below it. As already mentioned, this arrangement helps to reduce timing errors in delivery of seeds from the planters.

Compressed air is fed to the planters from a main air duct 208 which extends behind, above and parallel to the drive shaft 104; an air hose is provided linking this main air duct to a hollow tube 118 (FIG. 4) which feeds air into the housing 102 of each seed planter. The main air duct 208 is supplied by air under pressure from an air hose 212, which connects the main air duct 208 to the turbocharger (not shown) on the diesel engine of the tractor. Calculations indicate that the turbochargers used on commercially available 400 cubic inch (6.7 liter) diesel tractors will supply sufficient compressed air to meet the needs of a planter assembly containing approximately 30 planters without reducing the power output of the tractor engine by more than about 10%. Such a power loss is entirely acceptable, since seed planting is a much less power-intensive operation than, for example, plowing, and thus a tractor does not need to produce more than about half its maximum power output during seed planting. Using the tractor turbocharger to supply compressed air to the planter assembly of course avoids the need for a separate compressor. However, if an unturbocharged tractor is being used or if desired for some other reason to provide the planter assembly with an independent source of compressed air, the main air duct may of course be supplied with compressed air from a compressor mounted on the planter assembly. This compressor is conveniently powered from the conventional power take-off shaft found at the rear end of all commercial tractors.

It will be apparent to those skilled in the art that numerous changes and modifications can be made in the specific embodiments of the invention described above without departing from the scope of the invention. Accordingly, the foregoing description is to be construed in an illustrative and not in a limitative sense, the scope of the invention being defined solely by the appended claims.

I claim:

1. A seed planter comprising:
    a seed transport member having a surface in the form of a wall, means forming at least one depression therein, said depression means being able to accommodate a seed, the deepest portion of said depression means forming a tapering seed retaining section having its narrowest cross-section at its deepest part, said retaining section having the form of a solid of revolution having an axis, said axis being at an angle not perpendicular to said wall surface, said depression means also defining a ramp surface sloping downwardly from the wall surface into said seed retaining section, a gas supply conduit means in fluid communication with said seed retaining section of said depression adjacent the deepest part thereof;
    a seed loading station;
    a seed unloading station;
    drive means for moving said depression means past said seed loading station such that said ramp surface passes said seed loading station ahead of said seed retaining section, and for thereafter moving said depression past said seed unloading station;
    gas supply means for passing a stream of gas through said gas supply conduit means into said depression as said depression passes said seed loading station; and
    pressurizing means for increasing the pressure within the narrowest part of said seed retaining section after said depression has passed said seed loading station but not later than the time at which said depression passes said seed unloading station.

2. A planter according to claim 1 wherein said seed transport member has the form of a disc, said depression means is formed in one circular face of said disc, said ramp surface extends from the seed retaining section of said depression along a tangent to a circle concentric with said disc and said drive means comprises means for rotating said disc.

3. A planter according to claim 1 wherein said gas supply conduit means extends substantially along said axis of said seed retaining section of said depression.

4. A planter according to claim 1 wherein said ramp surface extends downwardly at an angle of 10° to 20° to the surrounding surface of said seed transport member.

5. A planter according to claim 1 wherein said pressurizing means comprises walls within said seed transport member defining an auxiliary gas supply conduit communicating with said depression means at a point spaced from the intersection of said gas supply conduit means and said depression means.

6. A planter according to claim 1 wherein said pressurizing means comprises means for interrupting the flow of gas through said gas supply conduit means.

7. A planter according to claim 1 wherein said seed retaining section of said depression is substantially conical.

8. A planter according to claim 7 wherein said conical seed retaining section has an apical angle of 70° to 110°.

9. A planter according to claim 1 wherein said seed transport member has the form of a disc, said depression means is formed in one circular face of said disc, said gas supply conduit means extends from said depression to the second circular face of said disc and a gas supply plenum capable of containing gas under pressure lies adjacent said second circular face of said disc and communicates with said gas supply conduit means.

10. A planter according to claim 9 wherein said drive means comprises a shaft for rotating said disc, said shaft passing through said gas supply plenum and having walls defining a shaft gas supply conduit extending axially within said shaft and also defining at least one aperture for allowing gas flow from said shaft gas supply conduit into said gas supply plenum.

11. A planter according to claim 1 wherein said gas supply means passes said stream of gas continuously through said gas supply conduit means as said drive means moves said depression means from said seed loading station to said seed unloading station and said pressurizing means increases the pressure within said narrowest part of said seed retaining section only when said depression means lies adjacent said seed unloading station.

12. A planter according to claim 11 wherein said pressurizing means is arranged to create an above ambient pressure in said narrowest part of said seed retaining section, thereby forcibly ejecting any seed in said depression means therefrom as said depression means passes said seed unloading station.

* * * * *